United States Patent [19]

Riewerts et al.

[11] 4,314,610
[45] Feb. 9, 1982

[54] FOLDABLE IMPLEMENT AND PIVOTAL BRACE THEREFOR

[75] Inventors: Paul R. Riewerts, Port Byron; David J. Wolak, Moline, both of Ill.

[73] Assignee: Deere & Company, Moline, Ill.

[21] Appl. No.: 152,260

[22] Filed: May 22, 1980

[51] Int. Cl.³ ............................................. A01B 73/00
[52] U.S. Cl. .................................. 172/776; 172/311; 280/411 R
[58] Field of Search ............... 172/311, 446, 456, 568, 172/581, 583, 662, 776; 56/228, 385; 280/411 R, 411 A, 412, 413, 639, 656

[56] References Cited

U.S. PATENT DOCUMENTS

| | | | |
|---|---|---|---|
| 2,327,834 | 8/1943 | White | 172/568 |
| 2,640,307 | 6/1953 | Robertson | 172/581 X |
| 2,737,766 | 3/1956 | Garner | 172/581 |
| 3,337,241 | 8/1967 | Neuhring | 280/411 R |
| 3,376,050 | 4/1968 | Lohrman | 280/411 R |
| 4,159,038 | 6/1979 | Eichenberger | 172/311 |
| 4,206,816 | 6/1980 | Richardson et al. | 172/311 |
| 4,249,616 | 2/1981 | Moe | 172/311 |

FOREIGN PATENT DOCUMENTS 664695 6/1963 Canada .

OTHER PUBLICATIONS

Kraus 1580 Series, Kraus Plow Corp., Hutchinson, Kansas 67501, Dec. 1977.

*Primary Examiner*—Richard T. Stouffer

[57] ABSTRACT

In an agricultural implement having a center section and a hinged wing section foldable over the center section to narrow it for transport, there is provided an improved support structure pivotally connected to the wing section which lies flat on the wing during field operations and automatically swings into its proper support orientation as the wing is folded. The support structure includes a brace member pivotally coupled with the wing section and spring loaded to swing away from the wing as the wing is folded. A stop is provided to properly orient the brace member relative to the wing and a guide surface is provided on the brace member to assure that it securely engages the frame of the center section.

9 Claims, 4 Drawing Figures

FOLDABLE IMPLEMENT AND PIVOTAL BRACE THEREFOR

BACKGROUND OF THE INVENTION

The present invention relates to agricultural earthworking implements, and more particularly relates to such implements having hinged wing sections which fold above a center section to narrow the implement for transport.

As tractor horsepower capacities have increased, the size and width of drawn agricultural earthworking implements have been increased to improve productivity. Such large and wide implements accordingly present problems when transported over the road or through field gates. A typical solution for narrowing these implements provides a center section with wings or side sections hinged to fold upwardly and inwardly over the center section.

Such large, folding implements must provide vertical supports for the wings when folded. Similar implements presently available often utilize rigid wing support stands fixed to the center section and projecting upwardly therefrom. As the wing section on this type of implement is folded up and over the center section, its frame structure contacts and rests upon the rigid upwardly projecting support stand.

This type of wing support must be massive to support the heavy wing sections and it is expensive to manufacture. Further, the aesthetic appearance of the implement is reduced by the presence of massive, upwardly projecting support stands on each side of the center section.

An alternative wing support structure is provided in U.S. Pat. No. 2,327,834 to White. White provides a swinging brace, pivotally connected to the wing to freely swing to a vertically hanging position as the wing is folded over the center section. The brace is then expected to contact the frame structure of the center section to support the wing section as it is folded over the center section for transport. This free-swinging brace, however, may not always be properly positioned to engage the frame structure of the center section and, therefore, may not provide support for the wing during the folding process. To assure proper positioning of the free swinging brace in White, the operator would have to position the brace while also cranking the wing section over and onto the center section. Further, the brace of White does not provide any means to prevent it from slipping out of place as uneven terrain is encountered during transport.

SUMMARY OF THE INVENTION

The present invention provides a swingable brace member which is pivotally mounted to the outer wing section of a disk harrow. The brace member lies flat upon the wing during earthworking field operations, pivotally swings outwardly away from the wing as it is elevated for transport to a position where it engages the frame structure of the main section. This support eliminates the massive rigid structures that project upwardly from the center section to support large, wide wing sections. The brace member is spring loaded and provided with a stop to limit swinging movement and assure that it is properly positioned for securely engaging the main section as it is folded. A guide structure is provided at the free end of the brace member to assure engagement with the frame of the main section. The spring and guide structure further serve to maintain the brace member in engagement with the center section frame during transport operations.

DESCRIPTION OF THE PREFERRED EMBODIMENT

Figure 1:
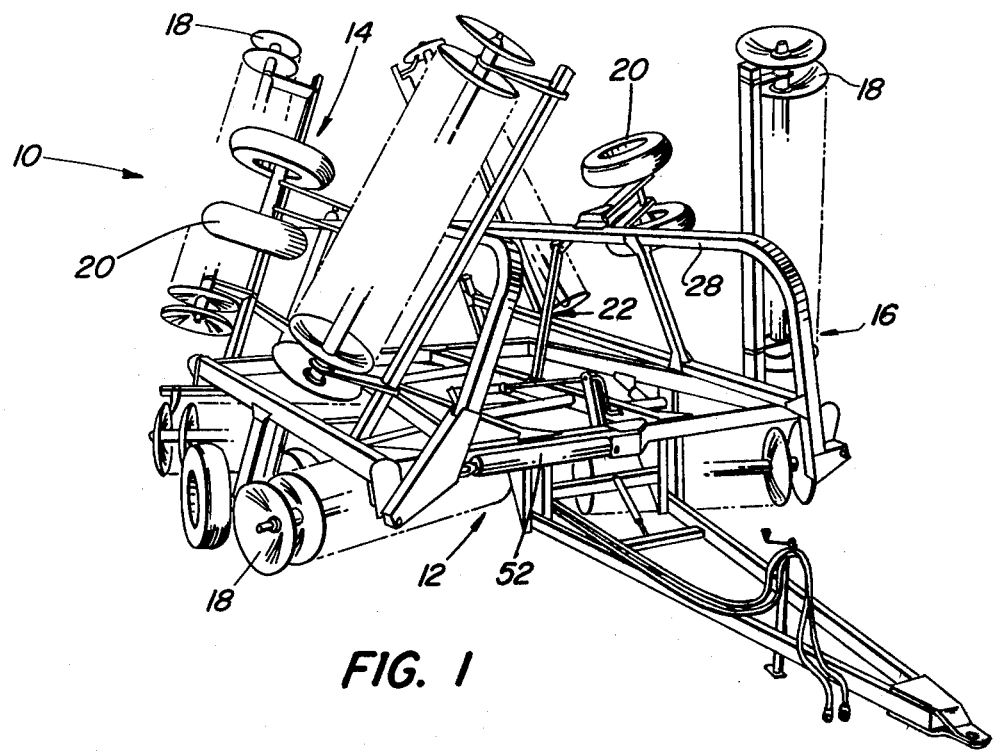
FIG. 1 is a front perspective view of a disk harrow utilizing the improved brace members for supporting the wing sections in a transport configuration.

The invention is shown in FIG. 1 in conjunction with a disk harrow implement. The disk harrow 10 includes a main section 12 and adjacent hinged wing sections 14 and 16. The wing sections are elevated and swung over the main section 12 for transport. Each wing section 14 and 16 includes earthworking tools, such as the disk blades 18 illustrated, and each wing section 14 and 16 is supported by its own ground-engaging wheels 20 for carrying the weight of that section and for controlling the depth to which the earthworking tools penetrate the ground.

Figure 2:
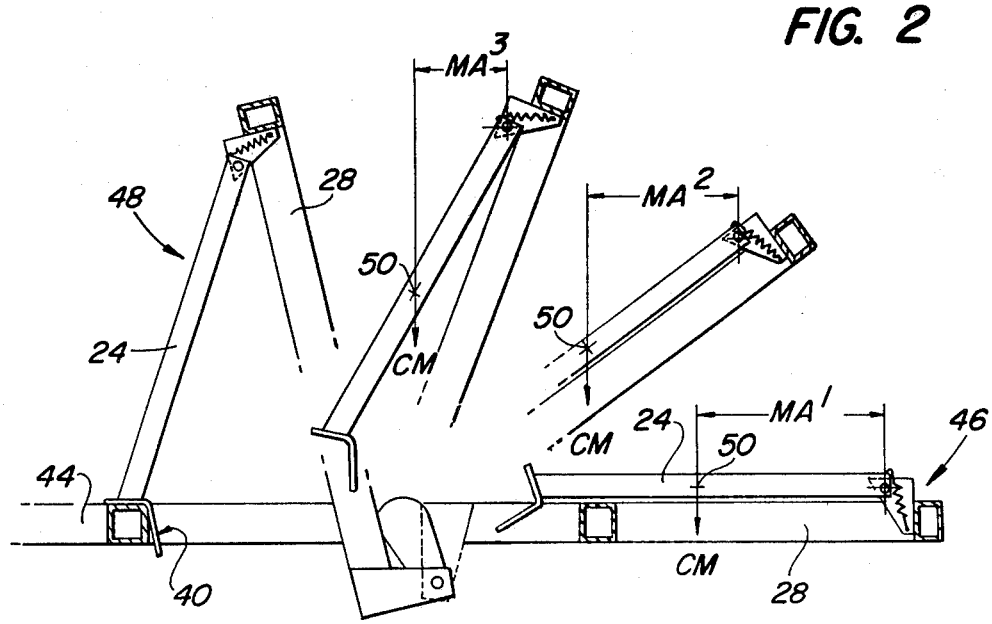
FIG. 2 is a partial end view of the brace member and wing section frame illustrating sequential positions of the brace member and the wing section as it is moved between its transport and operating position.
Figure 4:
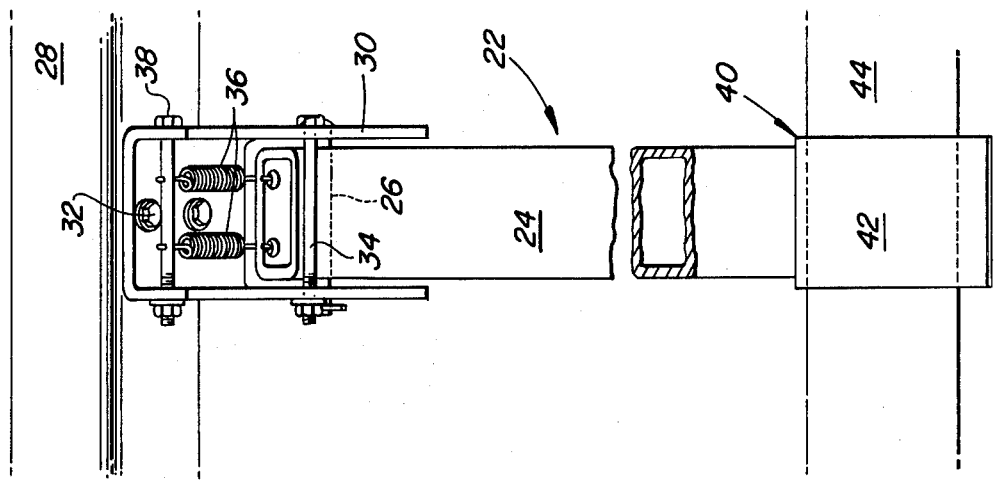
FIG. 4 is a view taken along lines 4—4 of FIG. 3.
Figure 3:
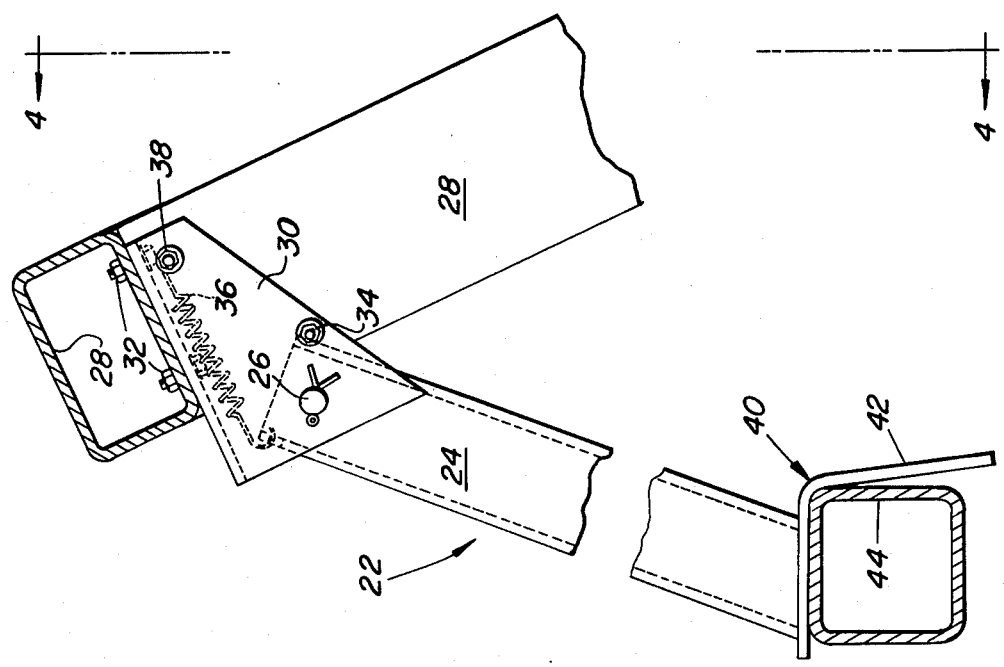
FIG. 3 is an expanded and broken view of the brace member illustrating the hidden springs, the stop and the pivot structure.

The support structure is identified by the number 22 generally. Each wing section 14 and 16 has its own support structures 22, and since these structures 22 are reversed but otherwise identical, only the support structure 22 of the right wing section 16 need be discussed in detail. The support structure 22 includes, as is best illustrated in FIGS. 2, 3 and 4, a brace member 24 connected by a pivot pin 26 to the frame 28 of the wing section 16. As best shown in FIG. 3, the brace member 24 includes an elongated, rectangular tubular member having an opening through which the pivot means 26 is received to secure it to the wing section 16. The pivot pin 26 is carried in a bracket 30, which in turn is secured to the frame 28 of the wing section 16 by bolts 32. In the preferred embodiment as illustrated in FIGS. 3 and 4, the bracket 30 is generally U-shaped and mounted to the inside vertical surface of the frame 28 of the wing section 16. The bracket member 30 further houses a stop pin 34 which engages one corner portion of the brace member 24 as it is swingably moved away from the frame 28 of the wing section 16. A biasing means including tension springs 36 is connected between the bracket-mounted bolt 38 and the brace member 24. At its other end, the brace member 24 carries a guide or seating structure 40. This structure 40 is composed of a flat plate 42 bent to an angle slightly greater than 90° so that it will easily seat on the frame 44 of the center section 12 when the wing section 16 is folded over the center section 12.

The support structure 22 is designed to rest flush upon the frame 28 of the wing section during operation and provide a low profile. As best illustrated in FIG. 2, it swingably moves from this position, identified by the number 46, to utlimately the position identified by the number 48 whereat it extends outwardly from the frame 28 of the wing section 16. The brace member swings away from the wing section 16 as it is elevated since its center of mass is located below the pivot 26 and the spring 36 acts on its end above the pivot to urge the brace 24 away from the wing section 16. The center of mass of the brace member 24 is located at approximately the point designated 50. An arrow designated CM is drawn through this point for purposes of this discussion.

When the wing section 16 is in its operating position, the center of mass acts through the point 50 and the summation of moments about the axis of the pivot pin 26 results in a net counterclockwise moment that causes the brace member 24 to rest upon the frame 28 of the wing section 16. As the wing section 16 is elevated through the sequential positions illustrated in FIG. 2, the moment arm through which the center of mass acts about the pivot pin 26 diminishes from that designated MA1 to MA2 and MA3. At about this time the spring 36 exerts sufficient force to cause the brace member 24 to swing outwardly to the position 48 where it will engage the center section frame 44. While a tension spring is preferred and illustrated, a compression spring could be located between the brace member 24 and frame 28 to push the brace member 24 from the wing section 16.

The stop pin 34 is provided to assure that the spring means 36 urges the brace member 24 to the proper angular position relative to the wing section 16 so that it will seat on the frame 44 of the center section 12. To further assure proper contact between the brace member 24 and the center section 12, the guide structure 40 is provided at the one end of the brace member 24. The guide structure 40 includes a flat plate 42 bent at slightly more than 90° to engage and be compatible with the frame 28 of the center section 12 upon which it must rest. The upright surface of the guide structure 40 is inclined slightly from vertical to engage the center section frame 44 and to slide down the center section frame 44.

In field operations, the implement wing sections 14 and 16 would be horizontal. When field operations were completed and the operator wanted to prepare the implement for transport, he would activate the hydraulic cylinder 52, illustrated in FIG. 1, to fold the wing sections 14 and 16 over the center section 12. As the wing sections 14 and 16 are elevated and rotated, the brace members 24 would sequentially move through positions comparable to those illustrated in FIG. 2. During this movement, the spring tension would act on each brace member 24 to swing it outwardly from its wing section 14 or 16 until the stop member 34 engaged it and limited its swinging movement. As each wing section 14 and 16 subsequently rotated to its final position, its guide structure 40 would contact the frame 44 of the center section 12 and prevent further swinging movement of the brace member 24 and assure solid engagement and support for the brace member 24 to securely maintain the wing section 14 or 16 over the center section 12 for transport. With this improved wing support means, an operator need not dismount his tractor or prepare the support structure for folding as he changes his implement from field operation configuration to transport configuration.

We claim:

1. In an earthworking agricultural implement having a main section connectible to a mobile vehicle, a wing section, hinge means between the main and wing sections permitting the wing section to be swung from a first and generally horizontal position outboard of the main section to a second and generally elevated position above the main section, folding means for swinging the wing section between the first and second positions, and an improved means for supporting the wing section when in its second position comprising: an elongated brace member; means pivotally connecting one end of the brace member with the wing section for permitting said member to swing toward the wing section as the latter is swung towards the first position; biasing means spacially separated from the folding means, said biasing means being located between the brace member and wing section and urging the other end of the brace member away from the wing section as the latter is swung toward the second position; and structure carried by the other end of said brace member engageable with the main section when said wing section is in its second position.

2. In an earthworking agricultural implement having a main section connectible to a mobile vehicle, a wing section, hinge means between the main and wing sections permitting the wing section to be swung from a first and generally horizontal position outboard of the main section to a second and generally elevated position above the main section, folding means for swinging the wing section between the first and second positions, and an improved means for supporting the wing section above the main section when it is in its second position comprising: an elongated brace member; pivot means connecting the brace member to the wing member for swinging movement, said pivot means being outboard of the hinge means when the wing section is in the first position; biasing means spatially separated from the folding means, said biasing means acting between the one end of said brace member and the wing section for swingably urging the other end of said brace member away from said wing section; and stop means between the wing section and brace member engageable to limit swinging movement of said member away from the wing section as said wing section is swung to its second position.

3. The invention defined in claim 2 wherein the brace member includes guide structure for locating the other end of said brace member relative to the main section as the wing section is swung to its second position.

4. In an earthworking agricultural implement having a main section connectible to a mobile vehicle, a wing section, hinge means between the main and wing section permitting the wing section to be swung from a first and generally horizontal position outboard of the main section to a second and generally elevated position above the main section, folding means for swinging the wing section between the first and second positions, and an improved means for supporting the wing section above said main section when it is in its second position comprising: pivot means on said wing section carried outboard of said hinge means; a brace member swingably carried on the pivot means for movement between a first position overlying said wing section when said section is in its first position and a second position projecting away therefrom when said wing section is in its second position, said brace member having a center of mass spaced from the pivot means and acting to swing said member toward its first position when the wing section is in the first position; and spring means between the wing section and brace member acting through a first moment arm to urge said brace member towards its second position, wherein the center of mass and pivot means define a second moment arm changeable with wing position through which the center of mass acts to swing the brace member to the first position, the second moment arm being sufficient in relationship to the first to overcome the urging of the spring means when the wing is in the first position, and decreasing as the wing section moves toward the second position to permit the spring means to move the brace member towards its second position.

5. The invention defined in claim 4 wherein the pivot means is attached to the brace member between the spring means and the center of mass of said brace member.

6. The invention defined in claim 4 wherein the center of mass of said brace member is located below the pivot means when the brace member is in its second position.

7. The invention defined in claim 4 wherein the improved support means further includes a stop means for restricting swinging movement of the brace member away from the main section.

8. In an earthworking agricultural implement having a main section connectible to a mobile vehicle, a wing section, hinge means between the main and wing section permitting the wing section to be swung from a first and generally horizontal position outboard of the main section to a second and generally elevated position above the main section, and an improved means for supporting the wing section above said main section when it is in its second position comprising: pivot means on said wing section carried outboard of said hinge means and attached to the brace member between the spring means and the center of mass of said brace member; a brace member swingably carried on the pivot means for movement between a first position overlying said wing section when said section is in its first position and a second position projecting away therefrom when said wing section is in its second position, said brace member having a center of mass spaced from the pivot means; and spring means between the wing section and brace member urging said brace member towards its second position.

9. In an earthworking agricultural implement having a main section connectible to a mobile vehicle, a wing section, hinge means between the main and wing section permitting the wing section to be swung from a first and generally horizontal position outboard of the main section to a second and generally elevated position above the main section, and an improved means for supporting the wing section above said main section when it is in its second position comprising: pivot means on said wing section carried outboard of said hinge means; a brace member swingably carried on the pivot means for movement between a first position overlying said wing section when said section is in its first position and a second position projecting away therefrom when said wing section is in its second position, said brace member having a center of mass spaced from the pivot means and located below the pivot means when the brace member is in its second position; and spring means between the wing section and brace member urging said brace member towards its second position.

* * * * *